United States Patent
Marsac

(10) Patent No.: US 7,597,835 B2
(45) Date of Patent: Oct. 6, 2009

(54) METHOD AND MACHINE FOR PRODUCING THREE-DIMENSIONAL OBJECTS BY MEANS OF SUCCESSIVE LAYER DEPOSITION

(76) Inventor: Nicolas Marsac, 145, rue du Mont-Cenis, F-75018 Paris (FR)

( * ) Notice: Subject to any disclaimer, the term of this patent is extended or adjusted under 35 U.S.C. 154(b) by 493 days.

(21) Appl. No.: 10/597,211

(22) PCT Filed: Feb. 4, 2005

(86) PCT No.: PCT/FR2005/050068

§ 371 (c)(1),
(2), (4) Date: Jul. 20, 2006

(87) PCT Pub. No.: WO2005/075179

PCT Pub. Date: Aug. 18, 2005

(65) Prior Publication Data

US 2009/0020919 A1    Jan. 22, 2009

(30) Foreign Application Priority Data

Feb. 6, 2004   (FR) .................................. 04 50221

(51) Int. Cl.
*B28B 1/02* (2006.01)
*B28B 1/14* (2006.01)
*B29C 35/08* (2006.01)

(52) U.S. Cl. ........................ 264/310; 264/401; 264/497; 264/112; 264/113; 264/125; 264/126; 264/163; 264/308; 425/110; 425/130; 425/314; 425/375; 425/447

(58) Field of Classification Search ................. 264/112, 264/113, 125, 126, 401, 63, 308, 497; 425/110, 425/130, 375, 447, 314
See application file for complete search history.

(56) References Cited

U.S. PATENT DOCUMENTS

| | | | | |
|---|---|---|---|---|
| 4,575,330 A | * | 3/1986 | Hull | 425/174.4 |
| 4,942,060 A | * | 7/1990 | Grossa | 427/553 |
| 4,961,154 A | * | 10/1990 | Pomerantz et al. | 345/419 |
| 5,258,146 A | * | 11/1993 | Almquist et al. | 264/401 |
| 5,460,758 A | * | 10/1995 | Langer et al. | 264/401 |
| 5,626,919 A | * | 5/1997 | Chapman et al. | 427/510 |
| 5,637,175 A | * | 6/1997 | Feygin et al. | 156/264 |
| 5,876,550 A | * | 3/1999 | Feygin et al. | 156/264 |
| 6,169,605 B1 | * | 1/2001 | Penn et al. | 358/1.1 |

(Continued)

FOREIGN PATENT DOCUMENTS

EP    0 715 573 B1    11/2001

(Continued)

*Primary Examiner*—Joseph S. Del Sole
*Assistant Examiner*—Timothy Kennedy
(74) *Attorney, Agent, or Firm*—Pearne & Gordon LLP

(57) ABSTRACT

Inventive machine allowing the simultaneous fabrication of several objects by a method of "rapid prototyping" type, by depositing a succession of layers of heat-fusible fluid.

It chiefly comprises a crossbar (20) carrying two platforms (11) on each of which an object is fabricated by deposition. Two fixed work stations are arranged diametrically opposite each other so that the jet (12) of each of these fixed stations can perform a depositing operation at the same time as the other jet (12). After each deposit, the crossbar is rotated 180° to alternate the depositing operations of the two different materials.

Particular application to prototyping jewellery models.

10 Claims, 5 Drawing Sheets

U.S. PATENT DOCUMENTS

| | | | |
|---|---|---|---|
| 6,215,093 B1 * | 4/2001 | Meiners et al. | 219/121.61 |
| 6,261,077 B1 * | 7/2001 | Bishop et al. | 425/174.4 |
| 6,325,961 B1 * | 12/2001 | Beers et al. | 264/401 |
| 6,401,795 B1 * | 6/2002 | Cesarano et al. | 164/46 |
| 6,508,971 B2 * | 1/2003 | Leyden et al. | 264/401 |
| 6,547,994 B1 * | 4/2003 | Monkhouse et al. | 264/40.1 |
| 2001/0050448 A1 * | 12/2001 | Kubo et al. | 264/308 |
| 2004/0026807 A1 * | 2/2004 | Andersson et al. | 264/40.1 |
| 2004/0265413 A1 * | 12/2004 | Russell et al. | 425/375 |
| 2006/0022379 A1 * | 2/2006 | Wicker et al. | 264/255 |
| 2006/0108712 A1 * | 5/2006 | Mattes | 264/308 |

FOREIGN PATENT DOCUMENTS

WO  95/05943  3/1995

* cited by examiner

METHOD AND MACHINE FOR PRODUCING THREE-DIMENSIONAL OBJECTS BY MEANS OF SUCCESSIVE LAYER DEPOSITION

FIELD OF THE INVENTION

The invention pertains to the production of objects in three dimensions by depositing successive layers, and more precisely to models. It therefore also concerns the area of <<rapid prototyping>>. It applies, inter alia, to the manufacture of models requiring high construction accuracy such as models for jewellery, spectacles, electronic packaging, aeronautics.

PRIOR ART AND PROBLEM RAISED

In the area of jewellery, it is known to produce models in three directions using so-called "rapid prototyping" systems. One type of these systems is based on placing heat-fusible material on a work platform, mobile along a vertical axis. This type of process consists of depositing a high number of successive layers, of constant or different thickness, whose successive surface areas correspond to the gradual forming, along a vertical axis, of the model to be produced. It is therefore necessary to define a large number of sections of the object to be produced by making successive slices of parallel planes, the distance between each section corresponding to the thickness of one layer. To reconstitute the object or model, the sections are stacked in sequence one on top of the other. It is to be noted that it is also known to use computer-aided design or digitizing tools to implement said process.

Depending upon methods, the materials used may be heat-setting liquids such as liquid resins or heat fusible materials such as waxes. It is noted that a shaving operation on each deposited layer is performed to calibrate the thickness and regularize the upper surface. A multitude of layers are thereby deposited on the preceding layer.

For the model production of objects of sophisticated shapes, it is known in the jewellery industry to produce a model by means of a large number of two series of successive layers, each consisting of different materials. One first material is used to form the final part, a second to form its support. The support material is removed by dissolving in a bath once the deposit and solidification of the successive layers are completed.

Also, with reference to FIG. 1, from European patent EP 0 715 573, a device is known for making three-dimensional models by the sequential formation of a multitude of layers one upon the other by drop depositing a modelling material. This device comprises:
- a platform 1 for the model to be produced, mobile along a vertical axis;
- a first main carriage 3A mobile along a longitudinal axis, giving support to a secondary carriage 3B mobile along an axis transverse to the preceding axis;
- two jets 2 depositing drops of the two materials one after the other, attached to the secondary carriage 3B;
- a third "loose" carriage 3C mobile along the longitudinal axis of the main carriage 3A, on which the shaver 3D is arranged intended to surface the layers produced, driven episodically after the depositing of each layer via action of the main carriage 3A;
- control means managing the positions of the mobile assemblies along the vertical, longitudinal and transversal axes, and the timed ejection of drops of materials.

The making of models using this type of device, depositing the two types of materials one after the other, is relatively long, namely several hours and even several days. There is therefore a need to accelerate the manufacture of this type of model.

The purpose of the invention is therefore to propose a method and a machine able to produce models quicker.

SUMMARY OF THE INVENTION

For this purpose, one first main object of the invention is a method for producing three-dimensional objects by forming a large number of successive parallel layers, along a first direction, each consisting of two heat-fusible modelling materials. The method using the two following main steps:
- a first step consisting of the timed supply of a first modelling material to at least a first jet positioned on a first fixed work station, and of moving the jet over the surface of a support platform along second and third directions perpendicular to the first direction and along a determined pathway, to place drops of material on the support surface; and
- a second step consisting of conducting the same operation with at least one second jet positioned on a second fixed work station and supplied with a second material, along another determined pathway, this cycle being renewed a sufficient number of times, with pathways determined in relation to the object, in order to construct the object.

According to the invention, since the platform consists of 2.N platforms on each of which the process is implemented, each of the 2.N platforms is alternately moved under a number N of fixed work stations each having at least one first jet to perform the first step, then under a same number N of fixed work stations each having at least one second jet to conduct the second step, in order simultaneously to achieve 2.N deposits of material on the 2.N platforms, each platform remaining separate from the other with respect to its mobility along a vertical direction.

Preferably after every second operation, surface shaving of the deposited layer is performed under a fixed shaving station with at least one shaver mounted rotatably about a fixed axis perpendicular to the first direction.

A second main object of the invention is therefore a machine to produce three-dimensional objects by forming a large number of successive, parallel layers along a first direction, each consisting of two modelling materials, on a supporting surface and by means of two jets each supplied with a different material at fixed work stations, and mobile relative to a main carriage along a second direction perpendicular to the first direction, the main carriage being mobile with respect to the fixed depositing station along a third direction perpendicular to the first direction, this machine implementing the steps of the above-mentioned method.

According to the invention, 2.N fixed work stations are used, the supporting surface consists of 2.N platforms on each of which the process is simultaneously conducted, the 2.N platforms being moved at the same time and alternately under a number N of first fixed work stations each carrying at least one first jet, by means of the mobile secondary carriage mobile to implement the first step, and under a same number N of second fixed work stations each carrying at least one second jet, by means of a mobile secondary carriage to implement the second step, in order simultaneously to produce 2.N objects.

Preferably, use is also made of a number N of fixed surface shaving stations positioned every second fixed work station between two adjacent work stations.

The main embodiment of the invention provides that the supporting surface is mounted rotatably about a main axis parallel to the first direction, the 2.N platforms being spaced apart at an angle to each other by an angle pitch of π/N, the 2.N fixed work stations also being spaced apart at an angle of π/N.

One particular embodiment of the inventive machine provides that N=1, the angle pitch being 180°, the fixed shaver station being offset by 90° with respect to the fixed work stations.

In this latter embodiment, the supporting surface is advantageously carried by a crossbar mounted rotatably about the main axis and carrying the two opposite platforms.

This assembly is advantageously completed by the use of an angle encoder positioned at the base of the crossbar.

This crossbar can advantageously be driven in rotation by an electric motor and a wheel/worm screw driving system.

The main and secondary carriages are advantageously driven by linear motors.

LIST OF FIGURES

The invention and its different embodiments and advantages will be better described in the following description accompanied by several figures, respectively illustrating:

FIG. 1, a prior art device for producing a three-dimensional model;

Figure 5:
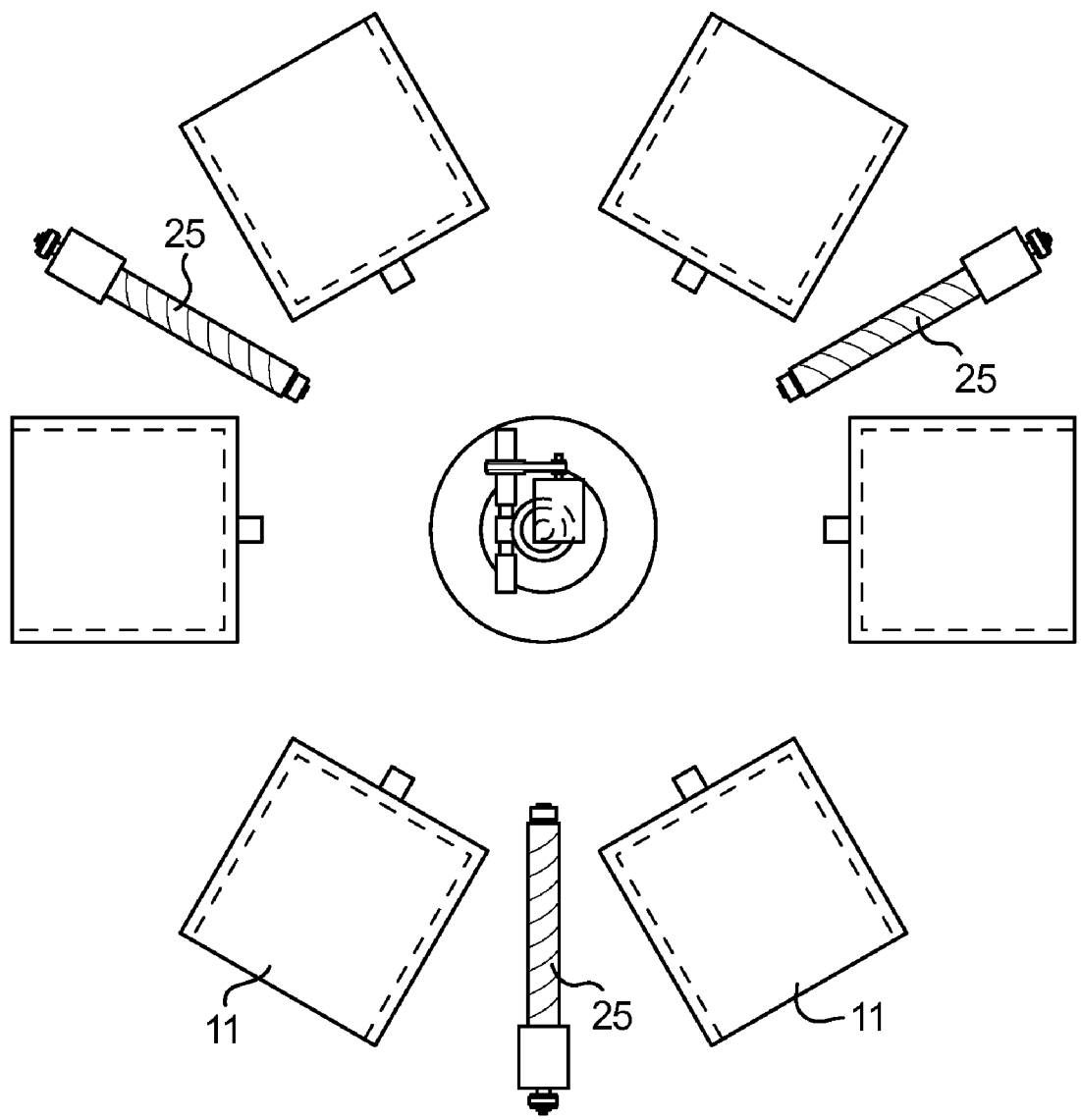

FIG. 5 schematically illustrates a possible further development of the inventive machine.

DETAILED DESCRIPTION OF TWO EMBODIMENTS OF THE INVENTION

Figure 2:
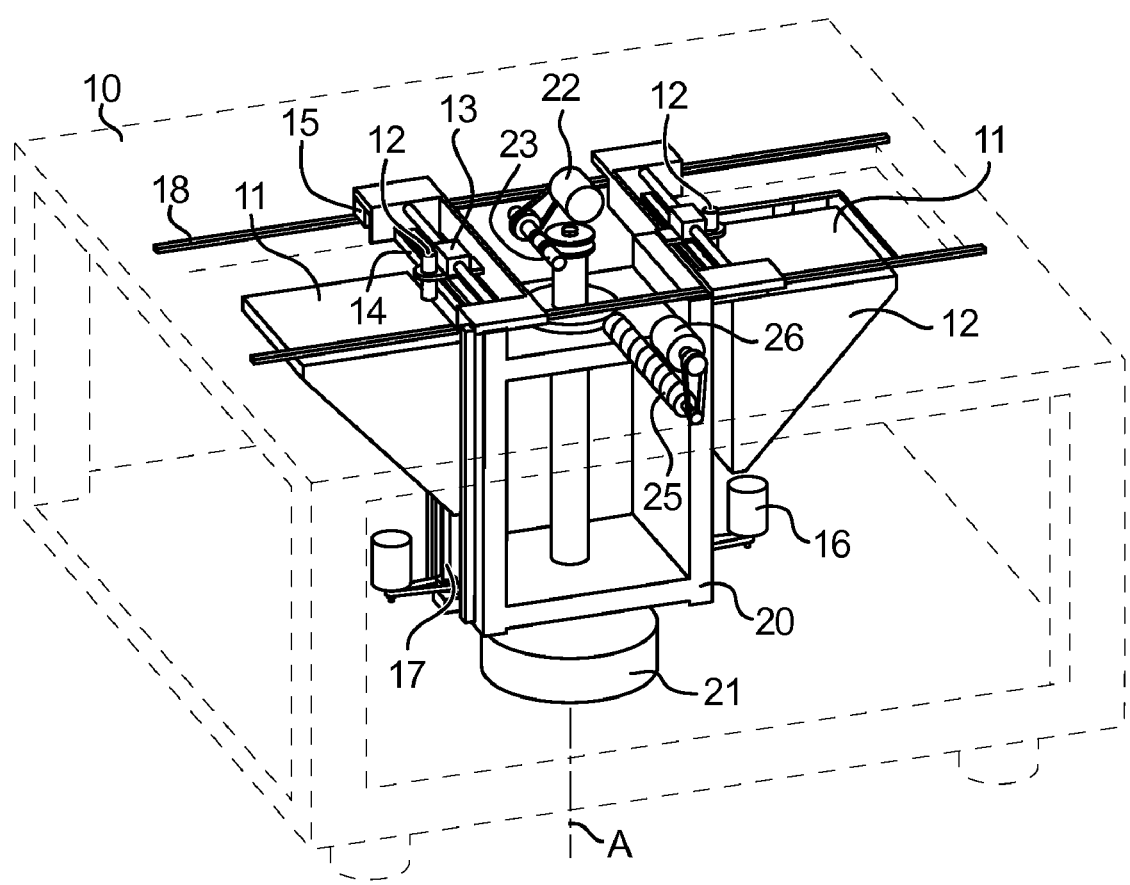
FIG. 2 is an aerial view of a preferred embodiment of the inventive machine.

With reference to FIG. 2, a preferred embodiment of the inventive machine provides that on a frame 10 of the machine, two work platforms 11 are mounted. These platforms are pivot mounted about a main vertical axis A, so that they can rotate about this axis and take up position alternately under two work stations symbolized by the two groups of tooling shown.

More precisely, a crossbar 20 forming a carrier structure is pivot mounted about the main axis A.

An encoder 21 is located underneath the crossbar 20, so as to be able to command its rotation about the main axis A. This crossbar 20 carries two supports 12 themselves each bearing a work platform 11. The two supports 12 are mounted mobile in vertical translation, parallel to the main axis A by means of two respective guide screws 17 and each driven by a motor 16. This movement allows progressive lowering of each of the platforms 11 after the depositing of a layer, during the manufacturing process of each object.

On each of these platforms 11, an object is therefore to be constructed by depositing numerous successive layers of two heat-fusible materials, by means of two jets 12 each positioned on a fixed depositing station arranged diametrically opposite one another.

The latter consist of a pair of parallel rails 18 on which a main carriage 14 is mounted mobile in horizontal translation. The movements of this carriage therefore follow a second direction perpendicular to the first direction symbolized by the main axis A which is vertical. On each of the main carriages 14 a secondary carriage 13 is mounted mobile in translation and carrying a jet 12. Each secondary carriage 13 is therefore mobile in horizontal translation along a third direction perpendicular to the second direction schematized by the main carriages 14. The three directions of movement mentioned are materialized in FIGS. 2, 3A, 3B and 3C by three orthogonal axes Ox, Oy and Oz. The respective carriages 13 and 14 may be driven by conventional mechanical systems of belt pulley or stepping motor type, but in the illustrated figure they are directly driven by linear motors 19A thereby eliminating any positioning errors due to wear of the components of conventional mechanical transmission systems. With the use of linear motors, movements are controlled by linear encoders.

It is therefore easy to understand that each jet 12 can be moved over a surface parallel to its respective platform 11 located below it, along the second and third directions, so that it can criss-cross the entire surface area represented by its corresponding platform 11. Only one jet 12 is shown, but several jets 12 can be mounted on a secondary carriage 13 forming a print head.

According to the inventive method, it is therefore possible to construct an object such as a model simultaneously on each of platforms 11, by means of the two jets 12 each simultaneously depositing a layer of heat-fusible material such as wax. One of the two jets 12 deposits a first material, e.g. a wax intended to form a final model, whilst the other jet 12 deposits a second material, here another wax, intended to form a support for the first material throughout the complete construction of the model.

Therefore, part of a layer with modelling wax is deposited on a first platform 11, while on the other platform 11 another part of the layer is deposited with the support wax. When each layer is completed, the platforms 11 are exchanged with respect to the jets 12, by rotating the crossbar 20.

It is useful to surface the layers of material deposited by one of the two jets. For this purpose a surface shaving station is provided on the frame 10. A shaver 25 is rotatably mounted on a fixed axis, rotating horizontally with respect to the frame. Its length is equal to the radial side of each platform 11, so that it can shave a surface area equivalent to the entire surface area of each platform as the latter rotates about the main axis A. This shaver is mounted at a height that is adjusted to shave each layer that is to be shaved after being deposited. The shaver 25 is driven in rotation by an ordinary motor 26. The direction of rotation of the crossbar 20 must take into account that the platform 11 on which only one of the materials has been deposited circulates opposite the shaver and therefore does not undergo shaving, solely the platform on which the two materials have been deposited being exposed to surfacing.

Figure 3A:
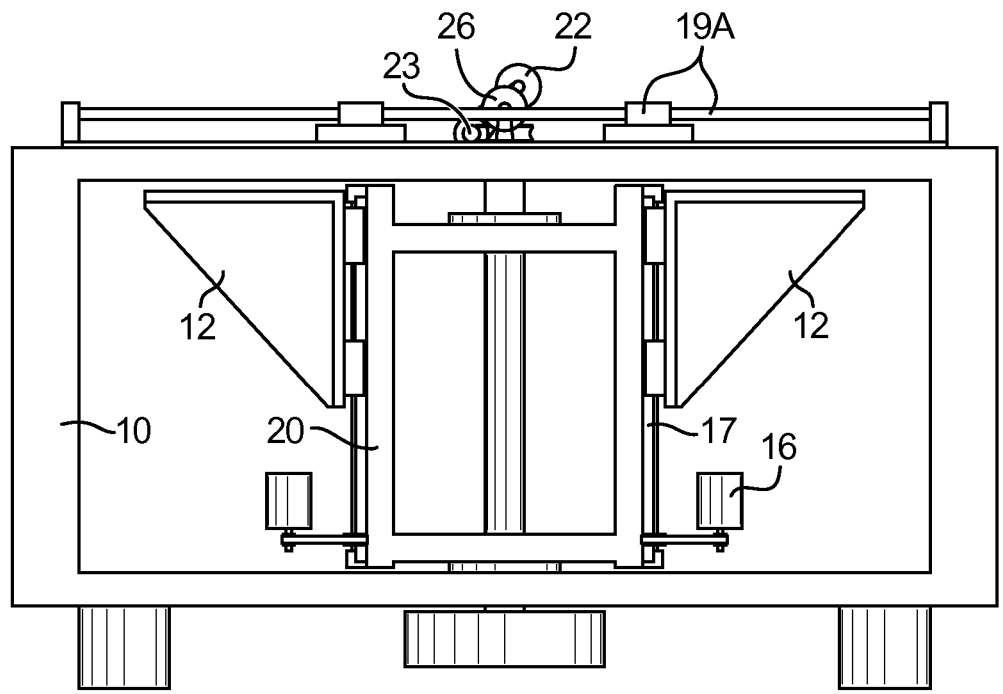
FIGS. 3A, 3B and 3C are three different views of the embodiment in FIG. 2.

FIG. 3A is a front view of the machine shown FIG. 2. It reproduces the main elements of the machine structure, namely the frame 10, crossbar 20 and the two supports 12 mounted thereupon. Three motors are also shown, namely motor 16 driving the guide screw 17 to lift and lower the supports 12, the motor 22 driving the wheel/worm screw system to rotate the crossbar, and motor 26 driving the shaver 25.

Figure 3B:
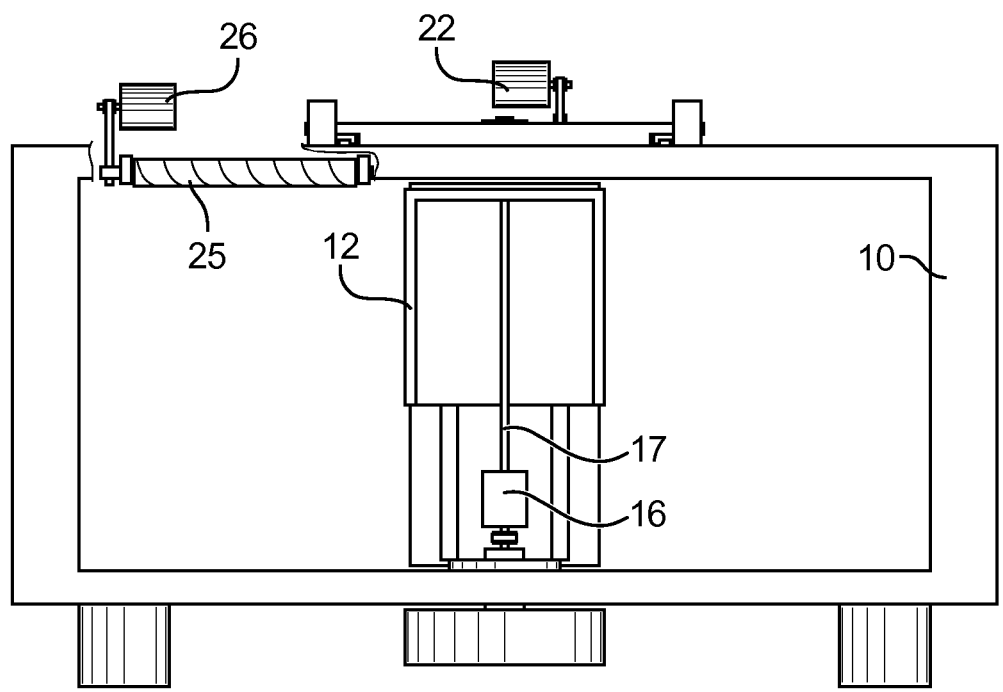

FIG. 3B is a side view of this assembly. It shows the support 12, motor 16 driving the guide screw 17 upwards and downwards, the motor 22 driving the crossbar 20 and the motor 26 driving the shaver 25. It can be seen in this FIG. 3B that this shaver 25 is of sufficient length to cover the entire radial side of a support 12.

Figure 3C:
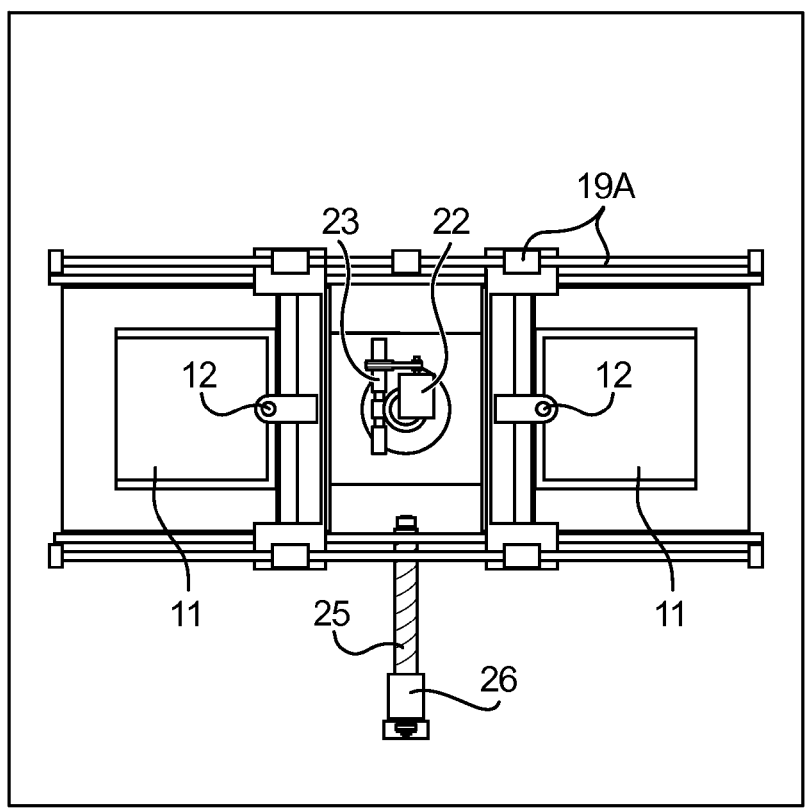

FIG. 3C is an overhead view of this assembly. It clearly shows the position of the shaver 25 and its driving motor 26 with respect to the position of the platforms 11 in work position. In this FIG. 3C, the fixed work stations are schematized by the two jets 12.

Figure 4:
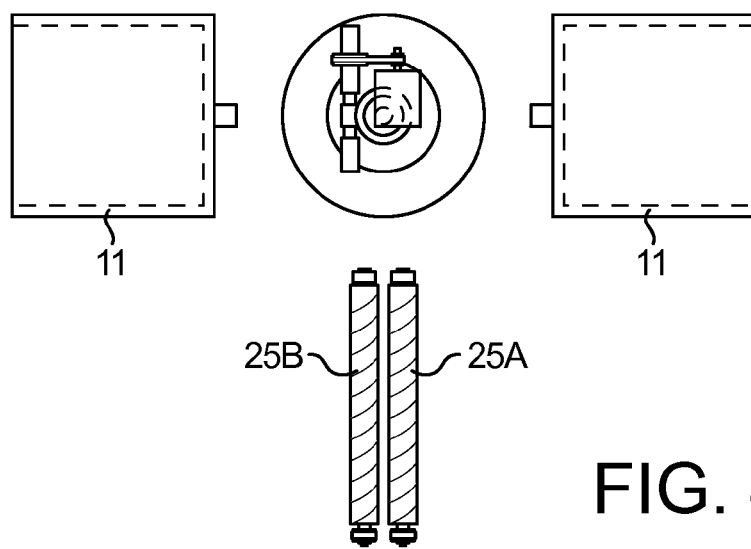
FIG. 4 is a variant of this same embodiment.

FIG. 4 shows a variant of embodiment of this machine in that, instead of a single shaver 25 as shown in the preceding figures, two shavers 25A and 25B are provided. These are positioned alongside each other to perform a surface shaving operation in two depth passes. It can be contemplated for example that the pass depth provided for a surface shaving operation is too deep to be made by a single shaver for a given material. The two shavers 25A and 25B are then positioned at different heights corresponding to the depth of the pass made by the first shaver. It is to be noted that the number of shavers is not limited to two as in the example illustrated FIG. 4.

With reference to FIG. 5, the number of platforms 11 can be an even number, greater than 2. In other words the number of platforms used following the inventive principle is 2.N. It is therefore possible to manufacture 2.N objects or models at the same time. FIG. 5 shows six platforms 11 (2.N where N=3) offset at an angle of 60° from one another ($\pi/N$ where N=3). Conjointly three shavers 25 have been positioned offset from each other at an angle of 120°, each positioned between two groups of two adjacent platforms 11. It can therefore be generally understood that after two operations to deposit successive layers at two fixed work stations, surface shaving can be performed.

The two embodiments described in this description are based on a machine comprising a crossbar that is rotatably mounted and supports 2.N platforms, the machine frame comprising a number 2.N of fixed work stations. It is possible to consider that the platforms 11 could be moved via conveying devices over a closed continuous pathway, irrespective of the form of the pathway.

Figure 1:
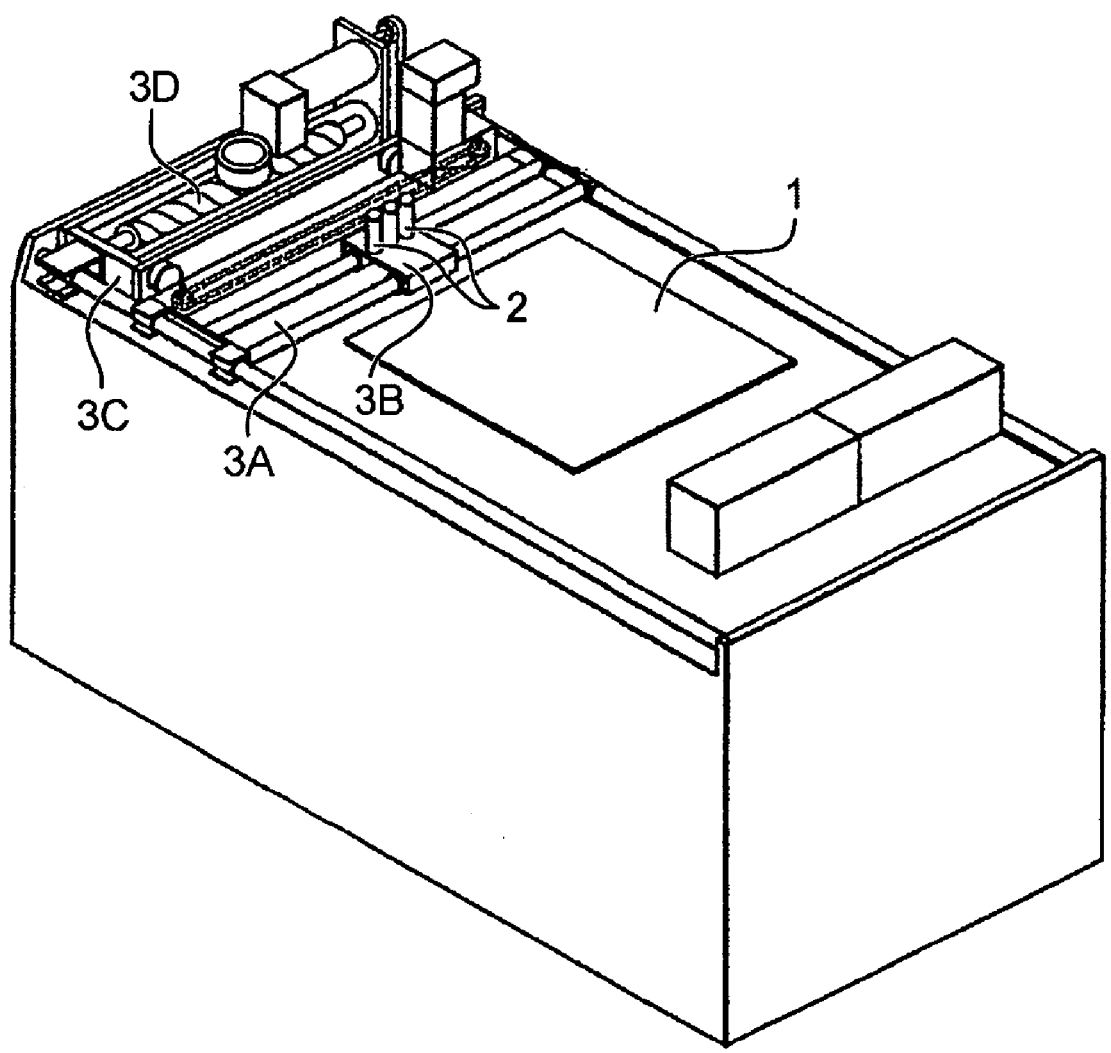

It can therefore be easily understood that with the inventive machine and method, it is possible to fabricate a number 2.N of objects simultaneously in a time equivalent to the fabrication time of one object with a prior art machine such as described with reference to FIG. 1.

The invention claimed is:

1. Method for producing three-dimensional objects by forming a large number of successive parallel layers in a first dimension and each consisting of two heat-fusible modelling materials, the method using the two following main steps:
   a first step consisting of the timed supply of a first modelling material to at least a first jet (12) positioned on a first fixed working station, and of moving the jet with respect to the supporting surface along second and third directions perpendicular to the first direction and over a determined pathway, to deposit drops of material on the supporting surface; and
   a second step consisting of conducting the same operation with a second jet positioned on a second fixed work station and supplied with a second material over a determined pathway, this cycle being renewed a sufficient number of times, with pathways determined in relation to the object, in order to construct the object,
   characterized in that the number of fixed work stations is 2.N, the supporting surface consists of 2.N platforms (11) on each of which the process is implemented, each of the two 2.N platforms (11) is alternately moved to lie under at least one of the N first jets (12) to conduct the first step, then under at least one of the N second jets (12) to conduct the second step, in order to deposit simultaneously 2.N deposits of material on the 2.N platforms (11).

2. Method as in claim 1, characterized in that surface shaving of the last deposited layer is performed after every second operation under a fixed shaving station with at least one shaver (25, 25A, 25B) mounted rotatably about a fixed axis perpendicular to a first direction.

3. Machine for producing three-dimensional models by forming a large number of successive, parallel layers along a first direction and each formed of two modelling materials on a supporting surface by means of at least jets (12) each supplied with one of the two materials at fixed work stations, and mobile with respect to a main carriage (14) along a second direction perpendicular to the first direction, the main carriage (14) being mobile with respect to the fixed depositing station along a third direction perpendicular to the first direction, characterized in that the supporting surface consists of 2.N platforms (11) on each of which the process is implemented simultaneously, the 2.N platforms (11) being moved at the same time and alternately under a number N of first depositing stations each carrying a first jet (12), by means of a mobile secondary carriage (13) to implement the first step, and under a same number N of second fixed depositing stations each carrying a second jet (12) by means of a mobile secondary carriage, to implement the second step in order to produce 2.N objects simultaneously.

4. Machine as in claim 3, characterized in that it comprises a number N of fixed surface shaving stations, positioned every second fixed depositing station between two adjacent depositing stations.

5. Machine as in claim 3, characterized in that the supporting surface is mounted rotatably about a main axis (A) parallel to the first direction, the 2.N platforms (11) being spaced at an angle from each other by an angle pitch of $\pi/N$, the 2.N depositing stations also being positioned at an angle of $\pi/N$.

6. Machine as in claim 5, characterized in that the number N equals 1, the angle pitch is 180°, the fixed shaving stations being offset by 90° with respect to the two fixed work stations.

7. Machine as in claim 6, characterized in that the supporting surface is carried by a crossbar (20) mounted rotatably about the main axis (A) and carrying two opposite platforms (11).

8. Machine as in claim 7, characterized in that it comprises an angle encoder (21) located at the base of the crossbar (20).

9. Machine as in claim 8, characterized in that the crossbar (20) is driven by a motor (22) and a wheel/worm screw driving system (23).

10. Machine as in claim 3, characterized in that the main (14) and secondary (13) carriages are driven by linear motors.

* * * * *

UNITED STATES PATENT AND TRADEMARK OFFICE
CERTIFICATE OF CORRECTION

PATENT NO. : 7,597,835 B2
APPLICATION NO. : 10/597211
DATED : October 6, 2009
INVENTOR(S) : Nicolas Marsac It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 553 days.

Signed and Sealed this

Twenty-eighth Day of September, 2010

David J. Kappos
*Director of the United States Patent and Trademark Office*